United States Patent
Lee et al.

(10) Patent No.: US 11,082,934 B2
(45) Date of Patent: Aug. 3, 2021

(54) METHOD FOR TRANSMITTING D2D SYNCHRONIZATION SIGNAL AND TERMINAL THEREFOR

(71) Applicant: LG ELECTRONICS INC., Seoul (KR)

(72) Inventors: Seungmin Lee, Seoul (KR); Byounghoon Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/507,671

(22) Filed: Jul. 10, 2019

(65) Prior Publication Data

US 2019/0335407 A1    Oct. 31, 2019

Related U.S. Application Data

(63) Continuation of application No. 15/511,619, filed as application No. PCT/KR2015/010733 on Oct. 12, 2015, now Pat. No. 10,383,071.

(60) Provisional application No. 62/062,113, filed on Oct. 9, 2014, provisional application No. 62/082,593, filed on Nov. 20, 2014.

(51) Int. Cl.
*H04W 56/00* (2009.01)
*H04W 92/18* (2009.01)
*H04W 76/14* (2018.01)

(52) U.S. Cl.
CPC ......... *H04W 56/001* (2013.01); *H04W 56/00* (2013.01); *H04W 56/0025* (2013.01); *H04W 76/14* (2018.02); *H04W 92/18* (2013.01)

(58) Field of Classification Search
CPC .......... H04W 56/001; H04W 56/0025; H04W 76/14
See application file for complete search history.

(56) References Cited

U.S. PATENT DOCUMENTS

2015/0016312 A1*   1/2015   Li ..................... H04W 74/006
                                                              370/280
2015/0117375 A1    4/2015   Sartori et al.
(Continued)

FOREIGN PATENT DOCUMENTS

WO    2014003430    1/2014
WO    2014137170    9/2014

OTHER PUBLICATIONS

U.S. Appl. No. 15/511,619, Notice of Allowance dated Mar. 26, 2019, 10 pages.
(Continued)

*Primary Examiner* — Redentor Pasia
(74) *Attorney, Agent, or Firm* — Lee Hong Degerman Kang Waimey

(57) ABSTRACT

Disclosed is a method for transmitting a synchronization signal of device-to-device (D2D) communication. The method for transmitting a D2D synchronization signal of the present application may comprise a step for transmitting a D2D synchronization signal according to one of transmission modes predetermined on the basis of an instruction of a base station. In addition, a transmission mode for D2D transmission may comprise a transmission mode on the basis of a signaling from the base station and a transmission mode on the basis of a reference signal reception power.

10 Claims, 10 Drawing Sheets eNB

UE 1

UE 2

(56) References Cited

U.S. PATENT DOCUMENTS

| | | | |
|---|---|---|---|
| 2015/0264677 A1* | 9/2015 | He | H04L 5/0069 |
| | | | 370/312 |
| 2015/0327195 A1 | 11/2015 | Chiu | |
| 2015/0327201 A1 | 11/2015 | He et al. | |
| 2016/0037385 A1* | 2/2016 | Boudreau | H04W 28/18 |
| | | | 370/328 |
| 2016/0044619 A1 | 2/2016 | Ryu et al. | |
| 2016/0044620 A1* | 2/2016 | Bagheri | H04W 56/0015 |
| | | | 370/252 |
| 2016/0183320 A1* | 6/2016 | Matsumoto | H04W 24/08 |
| | | | 370/252 |
| 2016/0255515 A1* | 9/2016 | Lindoff | H04W 74/0833 |
| | | | 370/252 |
| 2016/0295533 A1 | 10/2016 | Sorrentino | |
| 2017/0041773 A1* | 2/2017 | Fujishiro | H04W 76/14 |
| 2017/0142741 A1* | 5/2017 | Kaur | H04W 56/002 |
| 2017/0150480 A1* | 5/2017 | Kim | H04W 8/005 |
| 2017/0230919 A1* | 8/2017 | Siomina | H04W 52/383 |
| 2017/0295553 A1 | 10/2017 | Lee et al. | |
| 2019/0254006 A1* | 8/2019 | Basu Mallick | H04W 72/0446 |

OTHER PUBLICATIONS

PCT International Application No. PCT/KR2015/010733, Written Opinion of the International Searching Authority dated Mar. 25, 2016, 22 pages.

LG Electronics, "Discussion on D2D synchronization procedure", 3GPP TSG RAN WG1 Meeting #76bis, R1-141358, Apr. 2014, 5 pages.

LG Electronics, "Operation in Mode 1 resource allocation for D2D communication", 3GPP TSG RAN WG1 Meeting #76bis, R1-141352, Apr. 2014, 3 pages.

LG Electronics, "Discussion on resource allocation for D2D synchronization", 3GPP TSG RAN WG1 Meeting #76bis, R1-141356, Apr. 2014, 4 pages.

* cited by examiner

METHOD FOR TRANSMITTING D2D SYNCHRONIZATION SIGNAL AND TERMINAL THEREFOR

CROSS-REFERENCE TO RELATED APPLICATIONS

This application is a continuation of U.S. patent application Ser. No. 15/511,619, filed on Mar. 15, 2017, now U.S. Pat. No. 10,383,071, which is the National Stage filing under 35 U.S.C. 371 of International Application No. PCT/KR2015/010733, filed on Oct. 12, 2015, which claims the benefit of U.S. Provisional Application No. 62/062,113, filed on Oct. 9, 2014 and 62/082,593, filed on Nov. 20, 2014, the contents of which are all hereby incorporated by reference herein in their entirety.

TECHNICAL FIELD

The present invention relates to a wireless communication system, and more particularly, to a method for transmitting a device-to-device (D2D) synchronization signal and terminal therefore.

BACKGROUND ART

Recently, with the spread of smartphones and tablet PCs and activation of high-capacity multimedia communication, mobile traffic has significantly increased. Mobile traffic is expected to double every year. Since most mobile traffic is transmitted through a base station (BS), communication service operators are being confronted with serious network load. To process increasing traffic, communication operators have installed networks and accelerated commercialization of next-generation mobile communication standards, such as mobile WiMAX or long term evolution (LTE), capable of efficiently processing large amounts of traffic. However, another solution is required to cope with greater amounts of traffic in the future.

D2D communication refers to decentralized communication technology for directly transmitting traffic between contiguous nodes without using infrastructure such as a BS. In a D2D communication environment, each node of a portable device, etc. searches for physically adjacent devices, configures a communication session, and transmits traffic. Since such D2D communication is being spotlighted as the technological basis of next-generation mobile communication after 4G due to ability thereof to cope with traffic overload by distributing traffic converging upon the BS. For this reason, a standardization institute such as 3rd generation partnership (3GPP) or institute of electrical and electronics engineers (IEEE) is establishing D2D communication standards based on LTE-advanced (LTE-A) or Wi-Fi and Qualcomm etc. have developed independent D2D communication technology.

D2D communication is expected not only to contribute to increased performance of a mobile communication system but also to create a new communication service. Further, an adjacency based social network service or a network game service can be supported. A connectivity problem of a device in a shadow area can be overcome using a D2D link as a relay. Thus, D2D technology is expected to provide new services in various fields.

DISCLOSURE OF THE INVENTION

Technical Task

An object of the present invention devised to solve the problem lies in an efficient method for transmitting a D2D synchronization signal (D2DSS) in D2D communication.

Technical Solutions

The object of the present invention can be achieved by providing a method for transmitting a device-to-device (D2D) synchronization signal by a user equipment (UE) in a wireless communication system, including: receiving, from an evolved node B (eNB), a first signal indicating a D2D synchronization signal transmission mode including a first transmission mode and a second transmission mode; and performing transmission of the D2D synchronization signal according to the first transmission mode or the second transmission mode based on the first signal. In the first transmission mode, the transmission of the D2D synchronization signal may be performed based on a signal from the eNB, which indicates initiation of the D2D synchronization signal transmission. In the second transmission mode, the transmission of the D2D synchronization signal may be performed when a reference signal received power (RSRP) is equal to or smaller than a predetermined first threshold value.

In another aspect of the present invention, provided is a user equipment (UE) for transmitting a device-to-device (D2D) synchronization signal, including: a transceiver configured to transmit and receive radio signals; and a processor for controlling the transceiver. In this case, the processor may be configured to: receive, from an evolved node B (eNB), a first signal indicating a D2D synchronization signal transmission mode including a first transmission mode and a second transmission mode; and perform transmission of the D2D synchronization signal according to the first transmission mode or the second transmission mode based on the first signal. In the first transmission mode, the transmission of the D2D synchronization signal may be performed based on a signal from the eNB, which indicates initiation of the D2D synchronization signal transmission. In the second transmission mode, the transmission of the D2D synchronization signal may be performed when a reference signal received power (RSRP) is equal to or smaller than a predetermined first threshold value.

Advantageous Effects

According to embodiments of the present invention, D2D communication quality may be improved.

According to embodiments of the present invention, an efficient method for transmitting a D2DSS may be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR INVENTION

Figure 1:
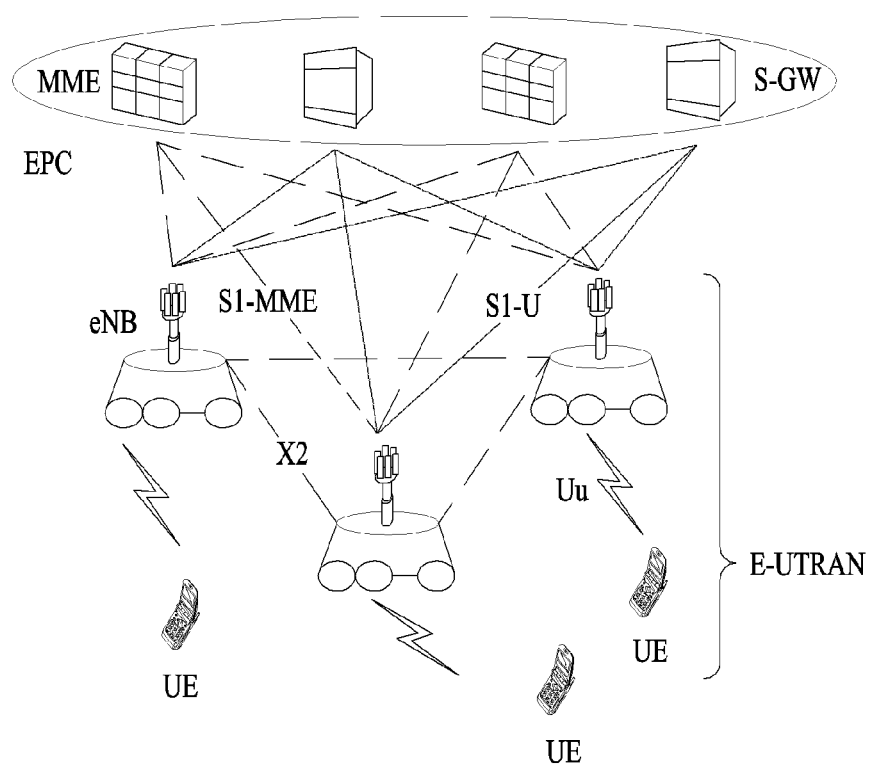
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from UMTS. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
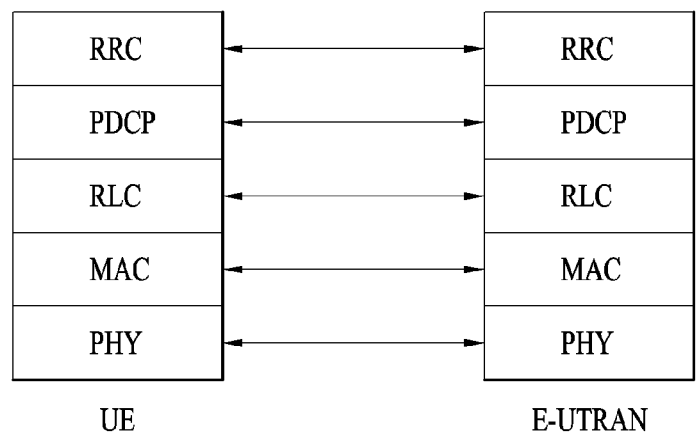
FIG. 2 illustrates a control plane of a radio protocol.
Figure 3:
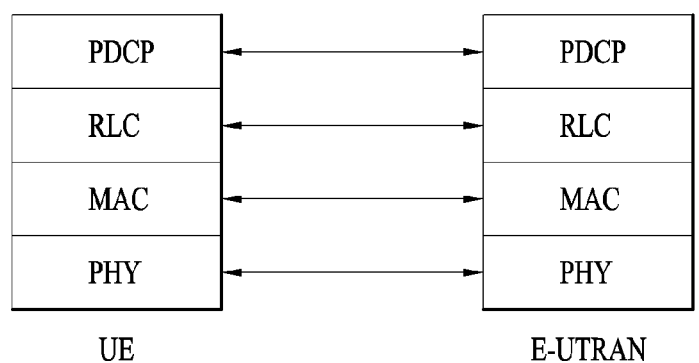
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Media Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of the Open System Interconnection (OSI) reference model widely known in the field of communication systems. These layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Media Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
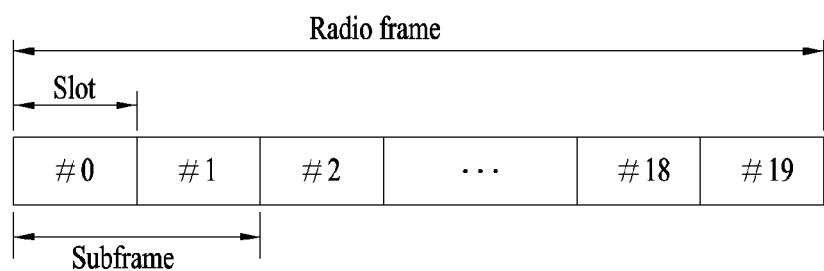
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
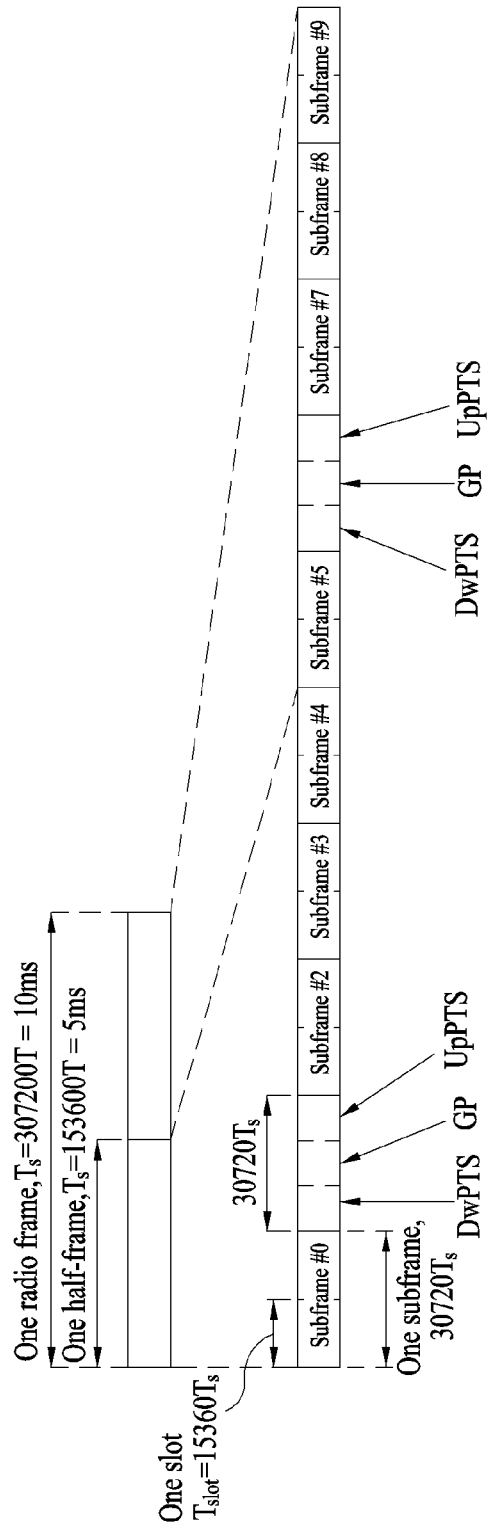
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
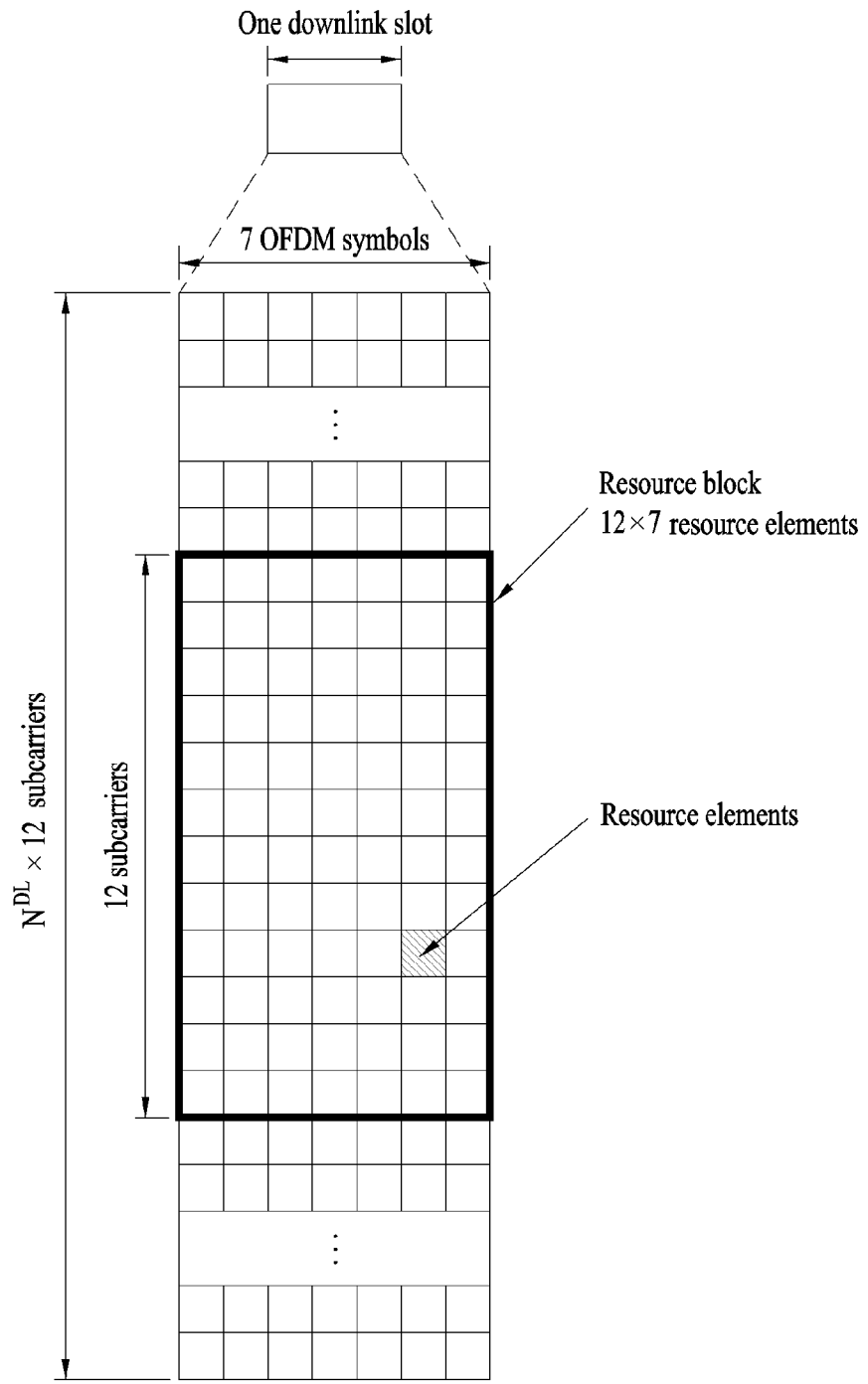
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 7:
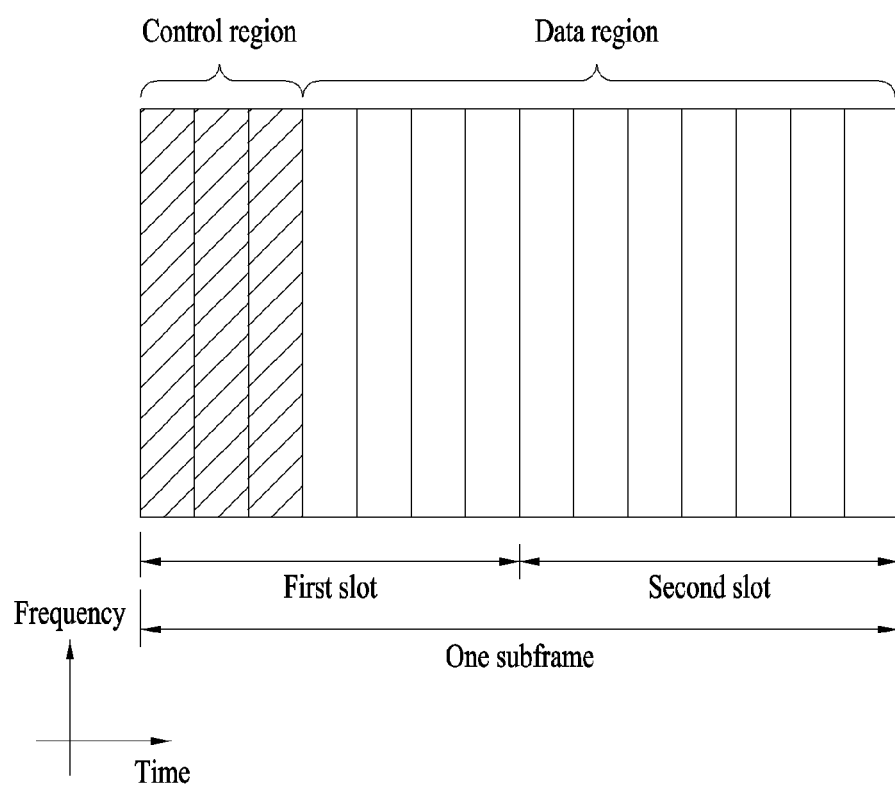
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
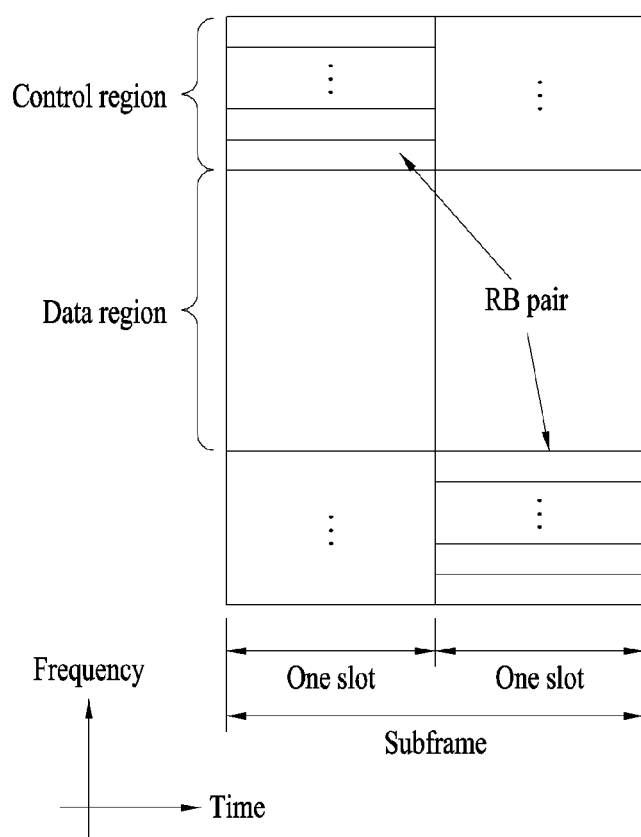
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Various embodiments related to D2D communication (also called D2D direct communication) will hereinafter be given. Although D2D communication will hereinafter be described based on 3GPP LTE/LTE-A, it should be noted that D2D communication may also be applied to other communication systems (IEEE 802.16, WiMAX etc.).

D2D Communication Type

D2D communication may be classified into Network coordinated D2D communication and Autonomous D2D communication according to whether D2D communication is executed under network control. The network coordinated D2D communication may be classified into a first type (Data only in D2D) in which D2D communication is used to transmit only data and a second type (Connection Control only in Network) in which the network performs only access control according to the degree of network intervention. For convenience of description, the first type will hereinafter be referred to as a Network Centralized D2D communication type, and the second type will hereinafter be referred to as a distributed D2D communication type.

In the Network Centralized D2D communication type, only data is exchanged between D2D UEs, and connection control between D2D UEs and radio resource allocation (grant message) may be carried out by the network. D2D UEs may transmit and receive data and specific control information using radio resources allocated by the network. For example, HARQ ACK/NACK feedback for data reception between D2D UEs, or Channel State Information (CSI) may not be directly exchanged between the D2D UEs, and may be transmitted to another D2D UE over the network. In more detail, if the network configures a D2D link between D2D UEs and allocates radio resources to the configured D2D link, a transmission D2D UE and a reception D2D UE may perform D2D communication using radio resources. In other words, in the network centralized D2D communication type, D2D communication between D2D UEs may be controlled by the network, and D2D UEs may perform D2D communication using radio resources allocated by the network.

The network in the distributed D2D communication type may perform a more limited role than a network in the network centralized D2D communication type. Although the network of the distributed D2D communication type performs access control between D2D UEs, radio resource allocation (grant message) between the D2D UEs may be autonomously occupied by competition of the D2D UEs without the help of the network. For example, HARQ ACK/NACK or CSI in association with data reception between D2D UEs may be directly exchanged between the D2D UEs without passing through the network.

As illustrated in the above example, D2D communication may be classified into network centralized D2D communication and distributed D2D communication according to the degree of D2D communication intervention of the network. In this case, the network centralized D2D communication type and the distributed D2D communication type are characterized in that D2D access control is performed by the network.

In more detail, the network for use in the network coordinated D2D communication type may configure a D2D link between the D2D UEs scheduled to perform D2D communication, such that connection between the D2D UEs may be constructed. When configuring a D2D link between the D2D UEs, the network may assign a physical D2D link identifier (LID) to the configured D2D link. When plural D2D links are present between the D2D UEs, the physical D2D link ID may be used as an ID for identifying each D2D link.

Unlike the network centralized and distributed D2D communication types, the autonomous D2D communication type may allow the D2D UEs to perform D2D communication freely without the help of the network. That is, unlike the network centralized and distributed D2D communication types, the autonomous D2D communication type may control the D2D UE to autonomously perform access control and radio resource occupancy. If necessary, the network may also provide the D2D UE with D2D channel information capable of being used in the corresponding cell.

D2D Communication Link Configuration

For convenience of description, a UE, which is scheduled to perform or can perform D2D communication including D2D direct communication, will hereinafter be referred to as a D2D UE. If a transmitter and a receiver need to be distinguished from each other, a D2D UE, which is scheduled to transmit or can transmit data to another D2D UE using radio resources allocated to the D2D link during D2D communication, will hereinafter be referred to as a transmission (Tx) D2D UE, or another UE, which is scheduled to receive or can receive data from the Tx D2D UE, will hereinafter be referred to as a reception (Rx) D2D UE. If a plurality of D2D UEs, which is scheduled to receive or can receive data from the Tx D2D UE, is used, the Rx D2D UEs may also be identified by ordinal numerals such as "1st to Nth". For convenience of description, either a base station (BS) for controlling access between the D2D UEs or allocating radio resources to the D2D link or a node (such as a D2D server, and an access/session management server) located at a network stage will hereinafter be referred to as a network.

D2D UE scheduled to perform D2D communication needs to pre-recognize the presence or absence of neighbor D2D UEs capable of transmitting and receiving data so as to transmit data to another D2D UE through D2D communication. For this purpose, the D2D UE may perform D2D peer discovery. The D2D UE may perform D2D discovery within a discovery interval, and all D2D UEs may share the discovery interval. The D2D UE may monitor logical channels of a discovery region within the discovery interval, and may thus receive D2D discovery signals from other D2D UEs. D2D UEs having received a transmission (Tx) signal from another D2D UE may construct the list of neighbor D2D UEs using a reception (Rx) signal. In addition, D2D UE may broadcast its own information (i.e., ID) within the discovery interval, and other D2D UEs may receive the broadcast D2D discovery signal, such that the presence of the corresponding D2D UE in a D2D communication available range may be recognized.

Information for the D2D discovery may be broadcasted periodically. In addition, a timing of such a broadcast may be determined by a protocol in advance and then informed D2D UEs. The D2D UE may transmit/broadcast a signal during a part of the discovery interval and each D2D UE may monitor signals potentially transmitted by other D2D UEs during the rest of the D2D discovery interval.

For instance, the D2D discovery signal may be a beacon signal. In addition, D2D discovery intervals may include a multitude of symbols (e.g., OFDM symbols). The D2D UE may transmit/broadcast the D2D discovery signal in a manner of selecting at least one symbol in the D2D discovery interval. Moreover, the D2D may transmit a signal corresponding to one tone existing in the symbol selected by the D2D UE.

After the D2D UEs discover each other through the D2D discovery process, the D2D UEs may establish a connection establishment process and transmit traffics to other D2D UEs.

Figure 9:
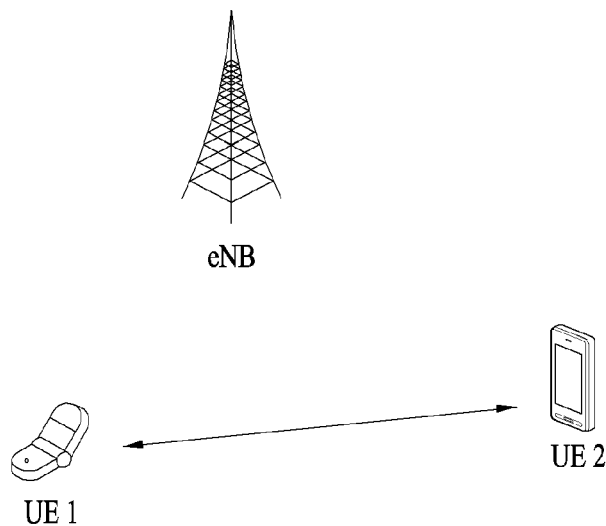
FIG. 9 shows a simplified D2D communication network.

FIG. 9 schematically shows a D2D communication network.

In FIG. 9, D2D communication is performed between UEs (UE1 and UE2) supporting the D2D communication. In general, a UE (user equipment) means a user terminal. However, when a network equipment such as an eNB (evolved Node B) transceives signals according to a communication scheme between UEs (UE1 and UE2), the eNB may also be regarded as a kind of the UE.

The UE1 may be configured to select a resource unit corresponding to specific resources in a resource pool indicating a set of resources and transmit a D2D signal using the corresponding resource unit. The UE2 corresponding to a receiving UE may receive a configuration of the resource pool used by the UE1 to transmit the signal and detect the signal of the UE1 in the corresponding resource pool. For example, when the UE1 is within a coverage of a BS, the BS may inform the resource pool. On the other hand, for example, when the UE1 is out of the coverage of the BS, another UE may inform the UE1 of the resource pool or the UE1 may determine the resource pool based on predetermined resources. Generally, the resource pool may include a plurality of resource units and each UE may select one or a plurality of resource units to transmit its D2D signal.

Figure 10:
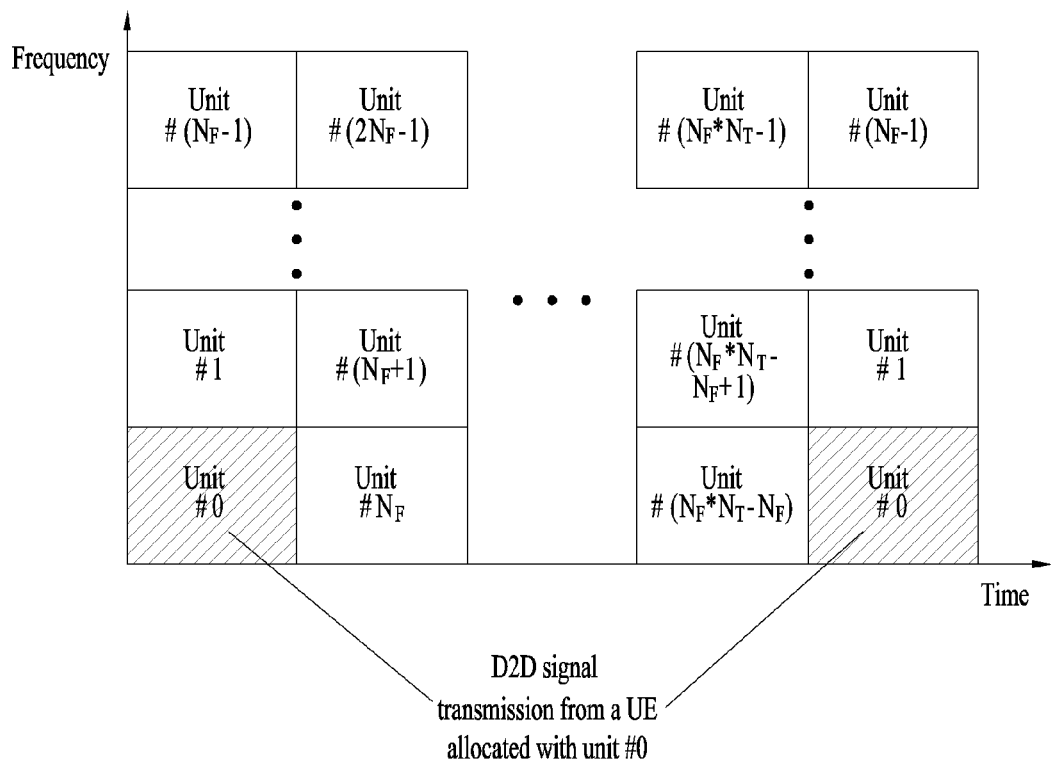
FIG. 10 illustrates configuration of a resource unit according to an embodiment.

FIG. 10 shows an example of a configuration of a resource unit.

In FIG. 10, a vertical axis means frequency resources and a horizontal axis means time resources. In addition, radio resources are divided into NT resources in the time axis, thereby configuring NT subframes. In addition, frequency resources are divided into NF resources in a single subframe, whereby the single subframe may include NT symbols. Thus, a total of (NF*NT) resource units may constitute a resource pool.

In an embodiment of FIG. 10, since a D2D transmission resource allocated to unit #0 is repeated every NT subframes, the resource pool may be repeated with a period of NT subframes. As shown in FIG. 10, a specific resource unit may be repeated periodically. In addition, to obtain a diversity effect in a time dimension or a frequency dimension, an index of a physical resource unit to which a single logical resource unit is mapped may be changed according to a predetermined pattern. For instance, the logical resource unit may be hopped on the time and/or frequency axes according to the pattern predetermined on the actual physical resource unit. In FIG. 10, the resource pool may mean a set of resource units that can be used by a UE intending to transmit a D2D signal to transmit the D2D signal.

The aforementioned resource pool can be subdivided into several types. For instance, the resource pool may be classified according to a content of the D2D signal transmitted in each resource pool. For example, the content of the D2D signal can be classified as follows and a separate resource pool may be configured for each content.

Scheduling assignment (SA): The SA (or SA information) may include a location of resources used by each transmitting UE for transmitting a following D2D data channel, MCS (modulation and coding scheme) necessary for demodulation of other data channels, and/or a MIMO (multiple input multiple output) transmission scheme. In addition, the SA information may include an identifier of a target user equipment to which the transmitting UE intends to transmit data. A signal containing the SA information may be multiplexed and transmitted with D2D data on the same resource unit. In this case, an SA resource pool may mean a resource pool in which the SA is multiplexed and transmitted with the D2D data.

D2D data channel: The D2D data channel may mean a resource pool used by the transmitting UE for transmitting user data by utilizing the resources designated through the SA. In case that the D2D data channel is multiplexed and transmitted with D2D resource data on the same resource unit, only the D2D data channel except the SA information may be transmitted in the resource pool for the D2D data channel. In other words, resource elements for transmitting the SA information on each individual resource unit in the SA resource pool may be used for transmitting the D2D data in the resource pool for the D2D data channel.

Discovery message: A discovery message resource pool may mean a resource pool for transmitting the discovery message. The transmitting UE may transmit the discovery message containing information such as its ID (identifier) for the purpose of enabling neighboring UEs to discover the corresponding transmitting UE.

As described above, the D2D resource pool may be classified according to the content of the D2D signal. However, although D2D signals have the same content, different resource pools may be used according to transmitting and receiving properties of the D2D signals. For instance, even in the case of the same D2D data channel or discovery message, different resource pools may be used according to a scheme for determining a transmission timing of the D2D signal (e.g., the D2D signal is transmitted at a reception time of a synchronization reference signal or at a time obtained by applying a timing advance to the reception time), a scheme for assigning a resource (e.g., an eNB designates a resource for transmitting each individual signal for each individual transmitting UE or each individual transmitting UE autonomously selects the resource for transmitting each individual signal from its resource pool), or a signal format (e.g., the number of symbols occupied by each D2D signal in a single subframe or the number of subframes used for transmitting a single D2D signal).

As mentioned in the foregoing description, a UE that intends to transmit data using the D2D communication may transmit its SA information by selecting appropriate resources from the SA resource pool. In addition, for instance, as reference for selecting the SA resource pool, resources not used by a different UE for SA information transmission and/or SA resources interconnected with resources in a subframe where data transmission is not expected after the SA information transmission by the different UE may be selected as the SA resource pool. Moreover, the UE may select SA resources interconnected with data resources where a low level of interference is expected.

In this regard, the resource allocation method for D2D data channel transmission may be divided into two modes.

Mode 1 may mean a method in which a cell (or network) directly designates resources used for Scheduling Assignment (SA) and D2D data transmission to individual D2D transmitting UEs. In this mode, the cell may recognize a UE which transmits a D2D signal and resources that UE use to transmit a signal. However, since designating a D2D resource for every D2D signal transmission may cause excessive signaling overhead, the cell may allocate a plurality of SA and/or data transmission resources to the UE through one-time signaling.

Mode 2 may mean a method in which a cell (or network) indicates a specific SA and/or D2D data-related resource pool to a plurality of D2D transmitting UEs, and an individual D2D transmitting UE selects an appropriate resource and transmits SA and/or data. In this case, it is difficult for the cell to accurately identify a resource which the UE uses for D2D transmission.

Meanwhile, the resource allocation method for discovery (DS) message transmission may be divided into two types.

Type 1 may refer to a DS procedure where a resource for transmitting a DS signal is allocated on a non-UE specific basis.

In addition, Type 2 may refer to a DS procedure where a UE-specific DS signal transmission resource is allocated. Type 2 may include Type 2A in which resources are allocated at the time of transmission of each specific DS signal and Type 2B in which resources for DS signals are semi-persistently allocated.

Figure 11:
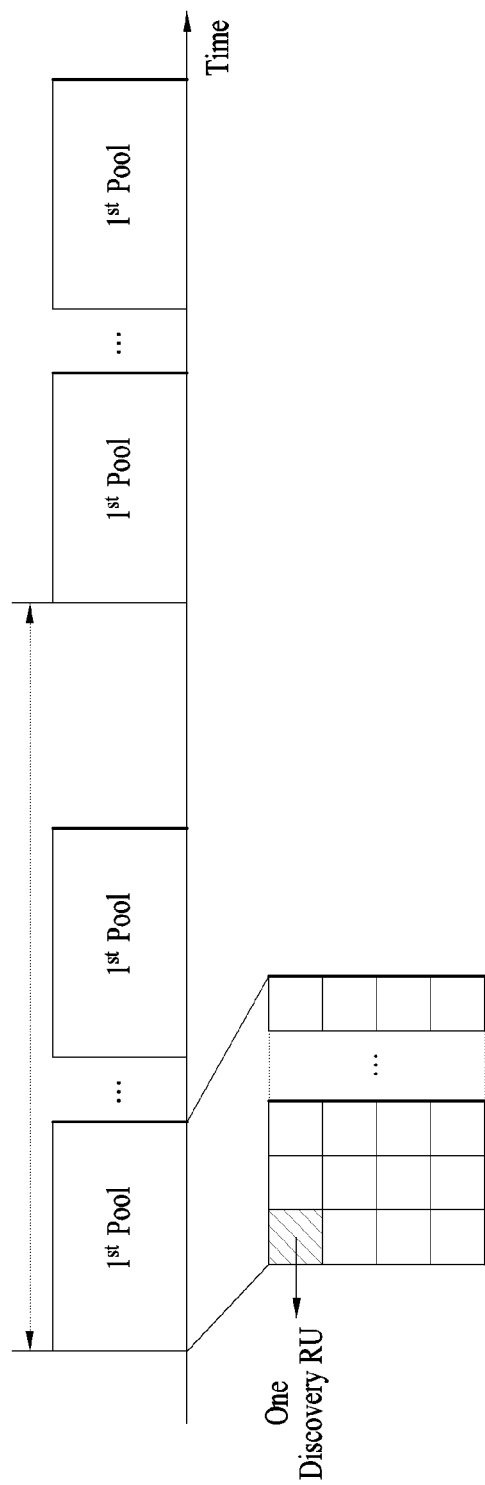
FIG. 11 illustrates a resource pool related to a periodic discovery message according to an example.

FIG. 11 illustrates a resource pool (e.g., discovery resource pool) related to a periodic discovery message according to one example.

In the example of FIG. 11, the period in which the discovery resource pool appears may be referred to as a discovery resource pool period. As shown in FIG. 11, one or more discovery resource pools may exist within the discovery resource pool period. For example, of the discovery resource pools within the discovery resource pool period, particular discovery resource pool(s) may be defined as discovery send/receive resource pool(s) associated with a serving cell, and the other (or remaining) discovery resource pool(s) may be defined as discovery receive resource pool(s) associated with a neighboring cell.

The resource configuration/allocation in D2D communication are described hereinabove with reference to FIG. 10 and FIG. 11. In the following description, a UE that transmits a D2D signal can be referred to as a D2D TX UE and a UE that receives a D2D signal can be referred to as a D2D RX UE.

Meanwhile, a D2D UE (i.e., a D2D TX UE and a D2D RX UE) may use a D2D synchronization signal to maintain/establish synchronization with an eNB or synchronization with other D2D UEs. In this case, D2DSS transmission/reception may be performed by an instruction from the eNB or according to a predefined D2DSS configuration.

Table 1 shows examples of D2DSS transmission/reception methods.

TABLE 1

| WORKING ASSUMPTION (RAN1#76BIS MEETING) |
|---|
| A synchronization source transmits D2DSS periodically<br>   D2DSS period is not smaller than 40 ms<br>     FFS whether D2DSS period is configurable/pre-defined, e.g., depending on scenarios |
| AGREEMENT (RAN1#76BIS MEETING) |
| For out-of-coverage,<br>   A UE can become a D2D Synchronization Source if received signal strength of all received D2DSS(s) by the UE are below X dBm. |

TABLE 1-continued

FFS on details of how to compute the received signal strength of a D2DSS.
FFS for how long the received signal strength has to be below X dBm.
The value of X dBm is pre-configured.
The value of X can be infinite, i.e., every UE can become a D2D Synchronization Source.
Set of other possible values of X is FFS.
Other criteria under which a UE may become a D2D synchronization source are not precluded - FFS.
Any possible conditions under which a UE shall not become or shall cease to be a D2D
synchronisation source are FFS.
For in-coverage,
A UE can become a D2D Synchronization Source at least if it is configured to do so by the eNB.
FFS whether any additional criteria have to be met before a UE that is configured to become
D2D synchronization source can become one.
FFS whether any special UE reporting is needed to assist the eNB.
FFS for other criteria, e.g. if the eNB has configured resources within which D2DSS may be
transmitted.
Consider interference impact to cellular in such cases.
FFS whether UEs in coverage have to be RRC connected in order to transmit D2DSS.
Any possible conditions under which a UE shall not become or shall cease to be a D2D
synchronisation source are FFS.
AGREEMENT (RAN1#76BIS MEETING)

For out-of-coverage UEs,
Synchronization resources that occur periodically are used for transmitting D2DSS.
FFS whether PD2DSCH (if supported) is transmitted.
Size of a synchronization resource is FFS.
It is fixed in specification.
Periodicity of synchronization resources is pre-configured.
Whenever a D2D Synchronization Source transmits on a synchronization resource, it transmits at least
D2DSS on the synchronization resource, and receives at least D2DSS on other synchronization
resource(s) (which may or may not be pre-configured).
Which synchronization resource is used for transmission is FFS.
FFS: timing offset between transmit and receive resources.
FFS: possible mechanism to handle the case of other out-of-coverage UEs transmitting on the same
synchronization resource as the UE is transmitting on.
WORKING ASSUMPTION (RAN1#76BIS MEETING): For both in-coverage and out-of-coverage, a
synchronization sesource for D2DSS occupies the 6 central RBs of a sub-frame.
AGREEMENT (RAN1#77 MEETING)

D2DSS transmission configuration is the same between D2D discovery and D2D communication if NW
supports both DTD communication and discovery.
For Type 1 discovery,
For a cell, within a discovery period, the first sub-frame of the transmission pool can be used for
transmitting the PD2DSS and SD2DSS by UEs transmitting discovery signals.
If Type 1 resource pool is configured using SIB then the PD2DSS and SD2DSS sequence transmitted
is configured using SIB.
The same PD2DSS and SD2DSS sequences is used for D2D communication.
Else sequence transmitted can be configured using dedicated RRC signaling.
For Type 2B discovery,
eNodeB can instruct UE to transmit PD2DSS and SD2DSS.
For both Type 1 and Type 2B the reception pool information contains information (implicitly or explicitly)
on which time resources and sequences UE should monitor for PD2DSS and SD2DSS if transmission of
PD2DSS and SD2DSS is configured.
FFS: If all discovery UEs transmit D2DSS.
AGREEMENT (RAN1#78BIS MEETING)

For in-coverage UEs,
A maximum of 1 D2DSS resource (comprising a periodically occurring subframe in which D2DSS may
be transmitted if the conditions below are satisfied (note that the eNB may reuse resources which are
not used for D2DSS transmission)) can be configured per cell for in coverage UEs
The D2DSS resource periodicity is:
The same for in-coverage and out-of-coverage
Fixed to one of {40, 80} ms in the specifications - FFS until Thursday
The D2DSS resource can be configured with a time offset with a granularity of 1 subframe
The D2DSS resource offset of neighbour cells can be signalled in a SIB w.r.t. SFN#0 of the
serving cell with a granularity of 1 subframe
For a UE transmitting SA or D2D data, in each subframe in the D2DSS resource, the UE shall transmit
D2DSS if:
the subframe does not conflict with cellular transmission from the UE perspective, AND
FFS other defined conditions, including e.g. UE capability, are satisfied, AND
the subframe is within the SA or D2D data period in which SA or data is transmitted, AND
the UE is RRC_Connected and the eNB has instructed it (by dedicated signalling) to start D2DSS
transmission, AND/OR FFS other condition(s) are satisfied if the UE is not transmitting SA or D2D
data within the SA/data period in which the subframe falls OR all of the following conditons are
satisfied:
an RSRP threshold for communication D2DSS transmission is confgured AND
if configured, the threshold is configured using SIB
the threshold can take values {−infinity, [−140 . . . −60] (increments of [10]),
+infinity}dBm (exact set of values TBD offline by Thursday)
the RSRP value of the UE is less than the threshold, AND
the eNB has not instructed the UE (by dedicated signalling) to stop D2DSS transmission.

TABLE 1-continued

For a discovery UE, for each discovery pool, the UE shall transmit D2DSS in the first subframe of the discovery pool if this subframe is in the D2DSS resource, or otherwise in the latest subframe of the D2DSS resource before the start of the discovery pool, if:
    the subframe does not conflict with cellular transmission from the UE perspective, AND
    FFS: the UE is not scanning for other D2DSS (details FFS), AND
    FFS other defined conditions, including e.g. UE capability, are satisfied, AND
    the UE transmits a discovery message in the discovery pool, AND
    the UE is RRC_Connected and the eNB has instructed it (by dedicated signalling) to start D2DSS transmission, OR all of the following conditions are satisfied:
        an RSRP threshold for discovery D2DSS transmission is configured, AND
          if configured, the threshold is configured using SIB
          the threshold can take values {−infinity, [−140 . . . −60] (increments of [10]), +infinity}dBm (exact set of values TBD offline by Thursday)
        the RSRP value of the UE is less than the threshold, AND
        the eNB has not instructed the UE (by dedicated signalling) to stop D2DSS transmission.
Out-of-coverage UEs do not transmit D2DSS on more than 1 D2DSS resource As described in Table 1, D2DSS transmission at an in-coverage (IN-CV) D2D UE can be divided into two types. According to the first type of D2DSS transmission, an IN-CV D2D UE (RRC_CONNECTED D2D UE) may perform D2DSS transmission after receiving an instruction (or command) to perform the D2DSS transmission from the eNB as described in Table 1 above (cf. Table 2 below). Hereinafter, the first type of D2DSS transmission operation can be named "TRG_D2DSSTX_MODE" for convenience of description.

Table 2 below is extracted from Table 1 to describe an example of the first type of D2DSS transmission operation.

TABLE 2

For a UE transmitting SA or D2D data, in each subframe in the D2DSS resource, the UE shall transmit D2DSS if:
    the subframe does not conflict with cellular transmission from the UE perspective, AND
    FFS other defined conditions, including e.g. UE capability, are satisfied, AND
    the subframe is within the SA or D2D data period in which SA or data is transmitted, AND
    the UE is RRC_Connected and the eNB has instructed it (by dedicated signalling) to start D2DSS transmission, AND/OR FFS other condition(s) are satisfied if the UE is not transmitting SA or D2D data within the SA/data period in which the subframe falls
For a discovery UE, for each discovery pool, the UE shall transmit D2DSS in the first subframe of the discovery pool if this subframe is in the D2DSS resource, or otherwise in the latest subframe of the D2DSS resource before the start of the discovery pool, if:
    the subframe does not conflict with cellular transmission from the UE perspective, AND
    FFS: the UE is not scanning for other D2DSS (details FFS), AND
    FFS other defined conditions, including e.g. UE capability, are satisfied, AND
    the UE transmits a discovery message in the discovery pool, AND
    the UE is RRC_Connected and the eNB has instructed it (by dedicated signalling) to start D2DSS transmission In addition, according to the second type of D2DSS transmission, when an IN-CV D2D UE has an reference signal received power (RSRP) value lower than RSRP THRESHOLD, the IN-CV D2D UE (RRC_CONNECTED D2D UE) may (arbitrarily or automatically) perform D2DSS transmission based on RSRP THRESHOLD information configured by (or signaled from) the eNB as described above in Table 1 (cf. Table 3 below). In this case, for example, if the IN-CV D2D UE (RRC_CONNECTED D2D UE) performing the second type of D2DSS transmission operation receives an instruction (or command) to stop D2DSS transmission (or the second type of D2DSS transmission) from the eNB, the IN-CV D2D UE (RRC_CONNECTED D2D UE) may stop the corresponding D2DSS transmission. Hereinafter, the second type of D2DSS transmission operation can be named "RSRP_D2DSSTX_MODE" for convenience of description.

Table 3 below is extracted from Table 1 to describe an example of the second type of D2DSS transmission operation.

TABLE 3

For a UE transmitting SA or D2D data, in each subframe in the D2DSS resource, the UE shall transmit D2DSS if:
    all of the following conditions are satisfied:
        an RSRP threshold for communication D2DSS transmission is configured, AND
          if configured, the threshold is configured using SIB
          the threshold can take values {−infinity, [−140 . . . −60] (increments of [10]), +infinity}dBm (exact set of values TBD offline by Thursday)

TABLE 3-continued the RSRP value of the UE is less than the threshold, AND
the eNB has not instructed the UE (by dedicated signalling) to stop D2DSS transmission.
For a discovery UE, for each discovery pool, the UE shall transmit D2DSS in the first subframe
of the discovery pool if this subframe is in the D2DSS resource, or otherwise in the latest
subframe of the D2DSS resource before the start of the discovery pool, if:
  all of the following conditions are satisfied:
    an RSRP threshold for discovery D2DSS transmission is configured, AND
      if configured, the threshold is configured using SIB
        the threshold can take values {-infinity, [-140 . . . -60] (increments of [10]),
      +infinity}dBm (exact set of values TBD offline by Thursday)
    the RSRP value of the UE is less than the threshold, AND
    the eNB has not instructed the UE (by dedicated signalling) to stop D2DSS
    transmission.

---

In the following, described are methods for enabling a D2D UE to efficiently perform D2DSS transmission. In addition, according to the following embodiments, a D2D UE's D2DSS transmission type (e.g., TRG_D2DSSTX_MODE and/or RSRP_D2DSSTX_MODE) can be changed flexibly or dynamically for efficient D2DSS transmission. For example, a rule may be defined such that the following embodiments are limitedly applied only to an IN-CV D2D UE (or RRC_CONNECTED D2DUE) and/or an out-of-coverage D2D UE (or RRC_IDLE D2DUE). For another example, a rule may be defined such that the following embodiments are limitedly applied only to a D2D UE (or communication D2D UE) that performs scheduling assignment (SA) or D2D data transmission and/or a D2D UE (or DISCOVERY D2D UE) that performs discovery transmission.

An eNB can instruct (or command) a D2D UE to switch its mode from the TRG_D2DSSTX_MODE to the RSRP_D2DSSTX_MODE through predefined signaling. For instance, such signaling may be performed using (UE-specific, UE-group-specific, or cell-specific) dedicated (RRC) signaling (or system information block (SIB)).

For example, through the above-described signaling, the eNB can efficiently control a ratio of the number of D2D UEs that perform D2DSS transmission based on the TRG_D2DSSTX_MODE in its communication coverage to the number of D2D UEs that perform D2DSS transmission based on the RSRP_D2DSSTX_MODE in its communication coverage. In addition, through the above-described signaling, the eNB can adjust the amount of D2DSS transmissions that have been performed or will be performed in its communication coverage (or an average amount of D2DSS transmissions).

As another example, if a D2D UE receives an instruction (or signaling) to stop the TRG_D2DSSTX_MODE, the D2D UE may be configured to implicitly interpret (or consider) the corresponding instruction (or signaling) as an instruction (or signaling) to switch to the RSRP_D2DSSTX_MODE.

As a further example, the eNB may be configured to instruct the D2D UE to switch from the RSRP_D2DSSTX_MODE to the TRG_D2DSSTX_MODE (or to stop the D2DSS transmission based on the TRG_D2DSSTX_MODE) through predefined signaling.

As a still further example, if a D2D UE performing the D2DSS transmission based on the TRG_D2DSSTX_MODE has an RSRP value lower (or higher) than predefined (or signaled) RSRP THRESHOLD, the D2D UE may be configured to perform the D2DSS transmission based on the RSRP_D2DSSTX_MODE by switching from the TRG_D2DSSTX_MODE to the RSRP_D2DSSTX_MODE. For instance, the eNB may inform the D2D UE of the above-mentioned RSRP THRESHOLD information through (UE-specific, UE-group-specific, or cell-specific) dedicated (RRC) signaling (or SIB). In addition, if the D2D UE has an RSRP value higher (or lower) than the predefined (or signaled) RSRP THRESHOLD due to change in its position, change in its external environment, and the like after changing its mode to the RSRP_D2DSSTX_mode, the D2D UE may (re)perform the D2DSS transmission based on the TRG_D2DSSTX_MODE. Such a rule may be interpreted as that the D2D UE's D2DSS transmission type (mode) is changed based on a preconfigured (or signaled) RSRP value and the rule may be applied either in a single direction (i.e., from the TRG_D2DSSTX_MODE to the RSRP_D2DSSTX_MODE or from the RSRP_D2DSSTX_MODE to the TRG_D2DSSTX_MODE) or in both directions (i.e., between the TRG_D2DSSTX_MODE and the RSRP_D2DSSTX_MODE). For instance, the above-mentioned operation (rule) may mean that if the D2D UE does not receive an instruction (or signaling) to switch between the TRG_D2DSSTX_MODE and the RSRP_D2DSSTX_MODE, switching operation between such D2DSS transmission types (modes) is continuously performed.

Table 4 shows an example of D2DSS transmission operation of a D2D UE.

TABLE 4

AGREEMENT:

For in-coverage UEs,
    A maximum of 1 D2DSS resource (comprising a periodically occurring subframe in which D2DSS
    may be transmitted if the conditions below are satisfied (note that the eNB may reuse resources
    which are not used for D2DSS transmission)) can be configured per cell for in coverage UEs
        The D2DSS resource periodicity is:
            The same for in-coverage and out-of-coverage
            Fixed to 40 ms in the specifications
        The D2DSS resource can be configured with a time offset with a granularity of 1
        subframe
            The D2DSS resource offset of neighbour cells can be signalled a SIB
            w.r.t. SFN#0 of the serving cell with granularity of 1 subframe TABLE 4-continued For a UE transmitting SA or D2D data, in each subframe in the D2DSS resource, the UE shall
    transmit D2DSS if:
        the subframe does not conflict with cellular transmission from the UE perspective, AND
        FFS other defined conditions, including e.g. UE capability, are satisfied, AND
        the subframe is within the SA of D2D data period in which SA or data is transmitted, AND
        the UE is RRC_Connected and the eNB has instructed it (by dedicated signalling) to start
        D2DSS transmission, AND/OR FFS other condition(s) are satisfied if the UE is not
        transmitting SA or D2D data within the SA/data period in which the subframe falls OR all
        of the following conditions are satisfied:
            an RSRP threshold for communication D2DSS transmission is configured, AND
                if configured, the threshold is configured using SIB
                the threshold can take values {−infinity, −115 . . . −60 (increments of 5),
                +infinity}dBm
            the RSRP value of the UE is less than the threshold AND
            the eNB has not instructed the UE (by dedicated signalling) to stop D2DSS
            transmission.
    For a discovery UE, for each discovery pool, the UE shall transmit D2DSS in the first subframe of
    the discovery pool if this sub-frame is in the D2DSS resource, or otherwise in the latest subframe
    of the D2DSS resource before the start of the discovery pool, if:
        the subframe does not conflict with cellular transmission from the UE perspective, AND
        FFS: the UE is not scanning for other D2DSS (details FFS), AND
        FFS other defined conditions, including e.g. UE capability, are satisfied, AND
        the UE transmits a discovery message in the discovery pool, AND
        the UE is RRC_Connected and the eNB has instructed it (by dedicated signalling) to start
        D2DSS transmission, OR all of the following conditions are satisfied:
            an RSRP threshold for discovery D2DSS transmission is configured, AND
                if configured, the threshold is configured using SIB
                the threshold can take values {−infinity, −115 . . . −60 (increments of 5),
                +infinity}dBm
            the RSRP value of the UE is less than the threshold, AND
            the eNB has not instructed the UE (by dedicated signalling) to stop D2DSS
            transmission.
  Out-of-coverage UEs do not transmit D2DSS on more than 1 D2DSS resource
    2 D2DSS resources are used for out-of-coverage
FFS whether the locations are preconfgured, signalled or fixed in the spec w.r.t. DFN#0
AGREEMENT:

In-coverage UE:
  If a UE is transmitting D2DSS/PD2DSCH
      If the UE is camping/connected to an eNB
        The D2DSS sequences and PD2DSCH contents are signaled by the eNB and no content is
        obtained from the pre-configuration
            DFN: same as SFN + subframe number in which the PD2DSCH is transmitted
            In-coverage indicator: 1
            Reserved field: from SIB
            D2DSS belongs to D2DSSue_net
Partial Coverage
  If a UE is transmitting D2DSS/PD2DSCH
      If the UE selects D2DSS/PD2DSCH from in-coverage UEs as its transmission timing reference and
      D2DSS belongs to D2DSSue_net (and thus the UE is not camping/connected to an eNB)
        The D2DSS sequences and PD2DSCH contents are the same as the received
        D2DSS/PD2DSCH and not the pre-configuration, except for:
            DFN: subframe in which the PD2DSCH is transmitted
            In-coverage indicator: 0
Out of coverage case 1
  If a UE is transmitting D2DSS/PD2DSCH
      If the UE selects D2DSS/PD2DSCH from out-of-coverage UEs as its transmission timing reference
      and D2DSS belongs to D2DSSue_net (and thus the UE is not camping/connected to an eNB)
        The PD2DSCH contents are the same as the received PD2DSCH, except for:
            DFN: subframe in which the PD2DSCH is transmitted
        D2DSS is the sequence in D2DSSue_oon that has the same index as the received
        sequence in D2DSSue_net
Out of coverage case 2
  If a UE is transmitting D2DSS/PD2DSCH
      If the UE selects D2DSS/PD2DSCH from out-of-coverage UEs as its transmission timing reference
      and D2DSS belongs to D2DSSue_oon (and thus the UE is not camping/connected to an eNB)
        The D2DSS sequence is the same as the received D2DSS
        PD2DSCH contents are the same as the received PD2DSCH, except for:
            DFN: subframe in which the PD2DSCH is transmitted
Out of coverage case 3:
  If a UE is transmitting D2DSS/PD2DSCH
      If the UE does not select any D2DSS/PD2DSCH at its transmission timing reference and it is not
      camping/connected to an eNB
        The PD2DSCH contents are determined by the pre-configuration, except for
            In-coverage indicator: 0
            DFN: using preconfigured value of syncOffsetIndicator, with the rest of the DFN
            being up to UE implementation for the first transmission
        D2DSS sequence is arbitrarily selected from D2DSSue_oon, and can only be reselected if
        there is a change of transmission timing reference TABLE 4-continued

AGREEMENT:

The order of decreasing priority for synchronisation source selection is as follows:
 1. eNBs that meet the Scriterion
 2. UEs within network coverage (among which higher priority is given to D2DSS received with higher synchSourceThresh measurement)
 3. UEs out of network coverage transmitting D2DSS from D2DSSue_net (among which higher priority is given to D2DSS received with higher synchSourceThresh measurement)
 4. UEs out of network coverage transmitting D2DSS from D2DSSue_oon (among which higher priority is given to D2DSS received with higher synchSourceThresh measurement)
If none of the above are selected, the UE uses its own internal clock.
Any possible hysteresis or reselection timer for the synchSourceThresh measurement is up to UE implementation.
Any possible performance requirements related to synchronisation source selection are up to RAN4.
It is up to RAN4 to define any possible criterion to ensure that only UEs which are received reliably are taken into account in the above selection procedure.

AGREEMENT:

offsetindicator should directly indicate offset
One of the two synchronisation resources that can be configured for out-of-coverage can be pre-configured using a synchOffsefIndicator which indicates a subframe offset with respect to the start of DFN#0, range {0 . . . 39};
 the other or the two synchronisation resources that can be configured for out-of-coverage has an independently pre-configured offset

AGREEMENT:

For an in-coverage D2D communication-capable UE that is not transmitting SA or D2D data, in each subframe in the D2DSS resource that does not conflict with cellular transmission from the UE perspective, the UE shall transmit D2DSS if the UE is RRC_Connected and the eNB has instructed it (by dedicated signalling) to start D2DSS transmission, AND the eNB has not instructed the UE (by dedicated signalling) to stop D2DSS transmission

AGREEMENT:

When an out-of-coverage UE selects D2D synchronization source using a D2DSS in D2DSSue_oon as its transmit timing reference, it transmits:
 the same D2DSS, with no indication of hop count,
 in the other out-of-coverage synchronization resource,
 the DFN of the subframe in which the PD2DSCH is transmitted
DFN is transmitted as 10-bit counter with 10 ms granularity and a 4-bit offset with range 0-9 ms
AGREEMENT: the in-coverage synchronization resource is the same as one of the out-of-coverage synchronization resources

AGREEMENT:

1 bit is included in PD2DSCH to indicate whether a UE is in coverage or not.
 Set to 1 if the UE is in coverage
 Set to 0 if the UE is out of coverage
When an out-of-coverage UE selects D2D synchronization source using a D2DSS in D2DSSue_net and the PD2DSCH indicating "in coverage" as its transmit timing reference, it transmits:
 the same D2DSS in D2DSSue_net
 in the other out-of-coverage synchronization resource,
 the DFN of the subframe in which the PD2DSCH is transmitted
When an out-of-coverage UE selects D2D synchronization source using a D2DSS in D2DSSue_net and the PD2DSCH indicating "out-of-coverage" as its transmit timing reference, it transmits:
 FFS between:
  the same D2DSS in D2DSSue_net
  a D2DSS in D2DSSue_oon
 in the other (i.e. other than the detected one) out-of-coverage synchronization resource,
 the DFN of the subframe in which the PD2DSCH is transmitted
FFS what potential prioritization may or may not be given to D2DSS in D2DSSue_net if PD2DSCH indicates "out-of-coverage"

AGREEMENT:

Total ID space is 168 in each of D2DSSue_net and D2DSSue_oon, i.e {0 . . . 167} for D2DSSue_net

AGREEMENT:

The PSSID is entirely indicated by the D2DSS.

AGREEMENT:

D2DSS ID in D2DSSue_net has range {0-167}
D2DSS ID in D2DSSue_oon has range {168-335}
PSSID is the same as D2DSS ID
Note that the index in the agreement where the index of the D2DSS sequence in D2DSSue_oon is the same as the index of the D2DSS sequence in D2DSSue_net assumes that the index is relative to the start of the range of the respective set of sequences.

TABLE 4-continued

AGREEMENT:

PD2DSCH contents:
 DFN: 14 bits = 10 bits counter + 4 bits offset
 TDD UL-DL config: 3 bits:
  In case of FDD, this field is set to 000, purely for the purpose of decoding of PD2DSCH and does
  not imply any other UE behaviour
  The UE is assumed to know a priori the duplex mode of the carrier
 In-coverage indicator: 1 bit
 Sidelink system bandwidth: 3 bits
 Reserved field: 20 bits set to a SIB-signalled or preconfigured value in Rel-12
 Inform RAN2 about the above content for PD2DSCH - include in LS to RAN2 and RRC spreadsheet.
 Indicate to RAN2 that the resource pool preconfiguration can be per value of system bandwidth.

Hereinafter, methods for enabling an OUT-OF-COVERAGE D2D UE (hereinafter abbreviated as an OOC D2D UE) to efficiently perform D2DSS transmission are described as another embodiment of the present invention. For instance, the following embodiment may be limitedly applied only to a case where the OOC D2D UE performs D2D communication.

For example, the OOC D2D UE may perform measurement (e.g., synchSourceThresh measurement (cf. Table 4)) based on a predefined (or signaled) signal (or channel). In addition, if the measurement value is equal to or lower than a predefined (or signaled) threshold value (e.g., synchSourceThresh measurement (cf. Table 4)), the OOC D2D UE may be configured to operate as an (independent) synchronization source.

For instance, the OOC D2D UE may perform the measurement based on a DM-RS (Demodulation-Reference Signal) (used in PD2DSCH decoding), a PD2DSS (Primary D2DSS), a SD2DSS (Secondary D2DSS), and/or a PD2DSCH (Physical D2D Shared CHannel). In addition, for example, the corresponding measurement value may be defined as an average (maximum, minimum, or harmonic average) value of signal (or channel) measurement values for performing measurement during a predefined (or signaled) time. When the OOC D2D UE operates as the (independent) synchronization source, the OOC D2D UE may be configured to (continuously) perform D2DSS transmission on predefined (or signaled) out-of-coverage synchronization resource(s) irrespective of whether SA and/or D2D data to be transmitted is transmitted (or exists). For example, for the OOC D2D UE, OOC synchronization resources may be configured with a specific location of D2DSS resource(s) or D2DSS resource set of two D2DSS resource(s) or D2DSS resource sets predefined (or signaled) at each D2DSS resource periodicity (e.g., 40 ms). For instance, the OOC synchronization resources may be composed of a first location of D2DSS resource(s) (or D2DSS resource set) or a second location of D2DSS resource(s) (or D2DSS resource set).

In addition, for example, the D2DSS transmission, which is performed by the OOC D2D UE on the predefined (or signaled) OOC synchronization resource(s) irrespective of whether the SA and/or D2D data is transmitted (or exists), may be performed during (only) a predefined (or signaled) time. For instance, the time for performing the D2DSS transmission may be determined based on the number of predefined (or signaled) SA periods (or D2D data periods).

Moreover, for example, when the OOC D2D UE (operating as the (independent) synchronization source) (re)sets a different (OOC or IN-CV) D2D UE (or eNB) as a timing reference or synchronization reference, the D2DSS transmission operation, which is performed irrespective of whether the SA and/or D2D data is transmitted (or exists), may be stopped (or released).

Since each of the examples of the aforementioned proposed methods can be also included as one of methods for implementing the present invention, it is apparent that each of the examples can be regarded as a proposed method. In addition, it may be able to implement each of the proposed methods not only independently but also by combining (or merging) some of the proposed methods. In addition, a rule may be defined such that the aforementioned proposed methods are limitedly applied only to the FDD system (or TDD system). Moreover, some or all of the aforementioned embodiments may be limitedly applied only to public safety (PS) discovery/communication and/or non-PS discovery/communication. Furthermore, some or all of the aforementioned embodiments may be limitedly applied only to the in-coverage or the out-of-coverage case. Further, some or all of the aforementioned embodiments may be extensively applied to V2V (vehicle-to-vehicle) communication, V2P (vehicle-to-pedestrian) communication, V2I (vehicle-to-infrastructure) communication, and/or vehicle-to-RSU (road side unit) communication.

Figure 12:
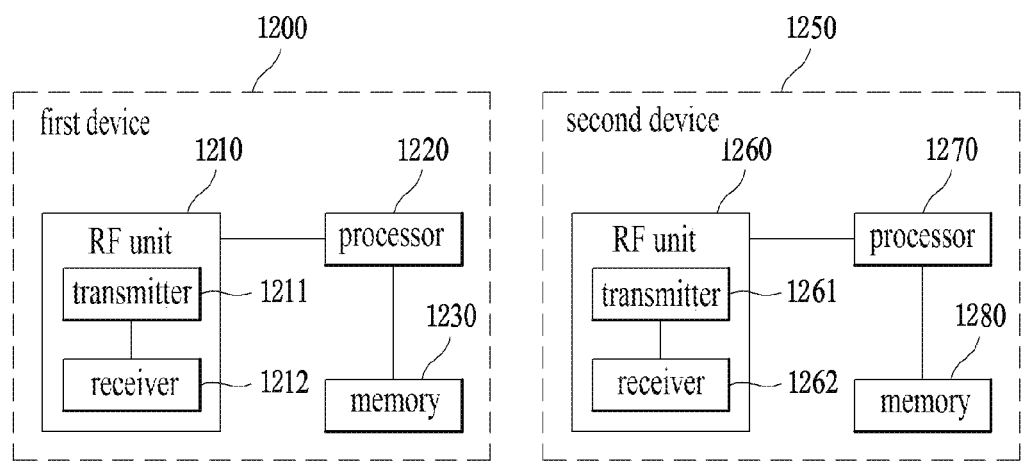
FIG. 12 is a schematic diagram illustrating devices according to an embodiment of the present invention.

FIG. 12 schematically illustrates configuration of devices to which the embodiments of the present invention illustrated in FIGS. 1 to 11 may be applied according to an embodiment of the present invention.

In FIG. 12, each of a first device 1200 and a second device 1250, which are D2D UEs, includes a radio frequency (RF) unit 1210, 1260, a processor 1220, 1270, and, optionally, a memory 1230, 1280. Although FIG. 15 shows configuration of two D2D UEs, a plurality of D2D UEs may establish a D2D communication environment.

Each of the RF unit 1230 and 1260 may include a transmitter 1211, 1261 and a receiver 1212, 1262. The transmitter 1211 and the receiver 1212 of the first device 1200 may be configured to transmit and receive signals to and from the second device 1250 and other D2D UEs, and the processor 1220 may be functionally connected to the transmitter 1211 and the receiver 1212 to control the transmitter 1211 and the receiver 1212 to transmit and receive signals to and from other devices. Meanwhile, the first device 1200 and/or the second device 1250 may be an eNB.

The processor 1220 may perform various kinds of processing on a signal to be transmitted, and then transmit the signal to the transmitter 1211, and process a signal received by the receiver 1212. If necessary, the processor 1220 may store, in the memory 1230, information contained in an exchanged message.

With the above-described structure, the first device 1200 may perform the methods of the various embodiments of the present invention described above. For example, each signal and/or message may be transmitted and received using a transmitter and/or receiver of the RF unit, and each operation may be performed under control of the processor.

Meanwhile, although not shown in FIG. 12, the first device 1200 may include various additional elements according to device application type. For example, if the first device 1200 is for intelligent metering, the first device 1200 may include an additional element for power measurement and the like. The operation of power measurement may be under control of the processor 1220 or a separately configured processor (not shown).

For example, the second device 1250 may be an eNB. In this case, the transmitter 1261 and receiver 1262 of the eNB may be configured to transmit and receive signals to and from other eNBs, D2D servers, D2D devices, and the processor 1270 may be functionally connected to the transmitter 1261 and receiver 1262 and may be configured to control the process of the transmitter 1261 and the receiver 1262 transmitting and receiving signals to and from other devices. In addition, the processor 1270 may perform various kinds of processing on a signal to be transmitted, transmit the signal to the transmitter 1261, and process a signal received by the receiver 1262. If necessary, the processor 1270 may store, in the memory 1230, information contained in an exchanged message. With the above-described structure, the eNB 1250 may perform the methods of the various embodiments described above.

In FIG. 12, the processors 1220 and 1270 of the first device 1210 and the second device 1250 respectively instruct operations for the first device 1210 and the second device 1250 (for example, control, adjustment, management, etc.). Each of the processors 1220 and 1270 may be connected to the memory 1230, 1280 that stores program code and data. The memories 1230 and 1280 may be connected to the processors 1220 and 1270 to store operating systems, applications, and general files.

The processors 1220 and 1270 of the present invention may be referred to as a controller, a microcontroller, a microprocessor, a microcomputer, or the like. Meanwhile, the processors 1220 and 1270 may be implemented by hardware, firmware, software, or a combination thereof. When embodiments of the present invention are implemented using hardware, the processors 1520 and 1570 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processor or may be stored in the memory and driven by the processor.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The above-described embodiments of the present invention can be applied to various kinds of mobile communication systems.

What is claimed is:

1. A method for transmitting a device-to-device (D2D) synchronization signal (SS) by a user equipment (UE), the method comprising:
    receiving, from a base station (BS), D2D SS configuration including first information regarding an in-coverage signal measurement threshold and second information regarding an out-of-coverage signal measurement threshold;
    while the UE is outside of a coverage of the BS, performing a D2D demodulation reference signal (DMRS) measurement for a D2D SS source;
    while the UE is outside of the coverage of the BS, configuring a D2D SS transmission mode based on a result of the D2D DMRS measurement and the out-of-coverage signal measurement threshold received through the second information; and
    while the UE is outside of the coverage of the BS, performing a D2D SS transmission based on the configured D2D SS transmission mode,
    wherein performing the D2D SS transmission comprises:
    based on the D2D DMRS measurement being smaller than the out-of-coverage signal measurement threshold received through the D2D SS configuration, transmitting a D2D SS that is different from the measured D2D DMRS.

2. The method of claim 1, wherein the D2D SS configuration is received through a predetermined dedicated signal, a predetermined radio resource control (RRC) signaling, or a system information block (SIB).

3. The method of claim 1, wherein the D2D SS configuration is received through a UE-specific signal, a UE-group-specific signal, or a cell-specific signal.

4. The method of claim 1, wherein the D2D DMRS measurement is related to reference signal received power (RSRP).

5. The method of claim 1, wherein the UE transmits the D2D SS as an independent D2D SS source that is independent from the D2D SS source related to the D2D DMRS measurement.

6. A non-transitory processor readable medium recorded thereon program codes for performing the method of claim 1.

7. A user equipment (UE) for transmitting a device-to-device (D2D) synchronization signal (SS), the UE comprising:
    a transceiver configured to transmit and receive radio signals; and at least one processor for controlling the transceiver,
wherein the at least one processor is configured to:
- receive from a base station (BS), D2D SS configuration including first information regarding an in-coverage signal measurement threshold and second information regarding an out-of-coverage signal measurement threshold;
- while the UE is outside of a coverage of the BS, perform a D2D demodulation reference signal (DMRS) measurement for a D2D SS source;
- while the UE is outside of the coverage of the BS, configure a D2D SS transmission mode, based on a result of the D2D DMRS measurement and the out-of-coverage signal measurement threshold received through the second information; and
- while the UE is outside of the coverage of the BS, perform a D2D SS transmission based on the configured D2D SS transmission mode, wherein in performing the D2D SS transmission:
- based on the D2D DMRS measurement being smaller than the out-of-coverage signal measurement threshold received through the D2D SS configuration, the at least one processor transmits a D2D SS that is different from the measured D2D DMRS.

8. The UE of claim 7, wherein the D2D SS configuration is received through a predetermined dedicated signal, a predetermined radio resource control (RRC) signaling, or a system information block (SIB).

9. The UE of claim 7, wherein the D2D SS configuration is received through a UE-specific signal, a UE-group-specific signal, or a cell-specific signal.

10. The UE of claim 7, wherein the D2D DMRS measurement is related to reference signal received power (RSRP).

* * * * *